3,278,568
HYDROGENATION OF LINOLEIC ACID
CONTAINING OILS
Albert de Jonge, Lukas Hans Ruiter, and Jacob Willem Emile Coenen, Vlaardingen, Netherlands, assignors to Lever Brothers Company, New York, N.Y., a corporation of Maine
No Drawing. Filed July 23, 1963, Ser. No. 296,946
Claims priority, application Great Britain, July 26, 1962, 28,805/62
17 Claims. (Cl. 260—409)

This invention relates to the treatment of oils especially edible oils that contain combined linoleic acid in addition to more highly unsaturated fatty acids such as linolenic acid, and provides a method of obtaining oils containing substantial proportions of linoleic acid which have improved keeping properties, and is concerned also with the use of oils of improved keeping properties so obtained and with products containing them.

Representative oils are for instance rapeseed oil, mustard oil, rubber-seed oil and wheat germ oil and especially soya bean oil.

It is generally known that the use of such oils has been greatly limited, particularly in high grade edible products, for example margarine or shortenings and dietary fats, owing to the difficulty of avoiding the rapid onset of flavour deterioration in these oils, and especially the formation of "reversion flavours," unless the oils are hydrogenated to such an extent as to leave little or no linoleic acid unreduced.

The ratio of the linoleic acid to linolenic acid in the oils under consideration can vary between rather wide limits. So, for example, soya bean oil generally contains 45 to 60% of linoleic acid together with 2 to 3 to 12 or 13%, usually 6 to 9%, of linolenic acid. (All the percentages of fatty acid in this specification are percentages of the total fatty acid content.) This high content of linoleic acid would make soya bean oil particularly interesting from the nutritional aspect if the keeping properties could be improved without destroying most of the acid. Thus, it is known that certain fatty acids, must be considered as indispensable components in human food and the most important representative of this class is cis,cis-9,12-octadecadienoic acid, i.e. linoleic acid. Moreover, extensive studies have shown that a high content of such unsaturated fatty acids in human food decreases the cholesterol level of the blood serum, which is generally considered to be beneficial with respect to the occurrence of heart and vascular diseases.

An important object of the present invention is to prepare an oil containing a substantial proportion of linoleic acid, especially an edible oil, which does not readily undergo flavour deterioration. The invention provides a method of preparing such oils from a natural unsaturated oil such as for example rapeseed oil, mustard oil, rubber-seed oil and wheat germ oil, and especially soya bean oil, which oils contain linoleic acid together with more unsaturated acids such as linolenic acid in a ratio of at least 1.5:1.

It has now been found, according to the invention, that the object referred to above can be achieved by first selectively hydrogenating the unsaturated oil to a relatively small extent at an elevated temperature in the presence of a hydrogenation catalyst comprising copper (which may be present in elementary and/or combined form), e.g. until the content of the more highly unsaturated fatty acids has been reduced to below 70%, preferably to below 25%, of the original content, while the original linoleic acid at least 40%, preferably at least 60% is retained, after which the hydrogenated oil is freed from practically all traces of copper.

Thus, for example, from a soya bean oil preferably pre-refined, having an iodine value of 130 to 140, and containing 53% of linoleic acid and 8% of linolenic acid, one can obtain by reaction with hydrogen at a pressure of 1 to 200 atmospheres and a temperature of 150° to 225° C., in the presence of a catalyst of the kind referred to above, an oil, in which the content of the combined linolenic acid is reduced to below 20% of the original content, while of the original linoleic acid content more than 75% is retained. Such results have been obtained by stopping the hydrogenation at an iodine value of 112 to 117. After this selective hydrogenation the product is freed from the catalyst by filtration in the absence of air and/or a temperature not greater than 100° C. The copper content is then further reduced to not more than 0.1 part per million by chemical reaction, for instance by washing with aqueous solutions of acids with dissociation constants of the first hydrogen atom not less than $10^{-3}$ and/or metal sequestering agents. In this way an oil has been obtained which, when refined, retained its palatability over long periods of storage and was of improved stability to frying temperatures.

Hydrogenation processes applied so far to edible oils, using a wide variety of catalysts, are characterised by a selectivity resulting in hydrogenation which either can be easily stopped or stops of its own accord when all the di- and poly-unsaturated fatty acid radicals have been converted into mono-unsaturated fatty acid radicals. These hydrogenation processes leading to the formation of major proportions of mono-unsaturated fatty acids, may be said to have a so-called "oleic acid selectivity." For the purpose of the invention this oleic acid selectivity is insufficient in that it involves modification of the linoleic acid.

According to the process of the present invention, however, the desired selective reduction of the poly-unsaturated acid without destroying the di-unsaturated acid (of which linoleic acid is the most important representative) is achieved, to a considerable extent, provided that the hydrogenation is stopped in time. Thus the process according to our invention may be said to have "linoleic acid selectivity."

The ratio K (=selectivity coefficient) of the specific hydrogenation rates for linolenic acid ($k_{Le}$) and linoleic acid ($k_L$), $$\left(K=\frac{k_{Le}}{k_L}\right)$$

may be used as a measure of this linoleic acid selectivity. K is used in this sense throughout the specification.

In the known hydrogenation processes referred to above it has not appeared to be possible to obtain values of K higher than about 2.8. This means in practice that a large proportion of linoleic acid present has been lost in eliminating the linolenic acid, in other words, in the known processes the "linoleic acid selectivity" is too low for obtaining oils containing high proportions of essential fatty acids.

In contrast with these known processes, values of K of at least 7, and even much higher, for instance 9–14, can readily be obtained by the process of the present invention.

An essential feature of the catalyst used is that it comprises copper, which may be present in elementary and/or combined form. The copper may for instance be present in the form of organic or inorganic compounds. A large variety of such catalysts is available. The active material may be dispersed on carriers, e.g. diatomaceous earth, activated clay, aluminium oxide, silica gel, chromium oxide, asbestos, iron oxide, titanium oxide, manganese oxide or the like. Suitable catalysts include copper formate, copper/kieselguhr, Cu/MgO, Cu/Cr$_2$O$_3$/BaO, Cu/Al$_2$O$_3$, Cu/MgO/SiO$_2$. These catalysts may be obtained by precipitating copper compounds from solutions by means of an alkaline reagent with or without co-precipitation of other compounds, after which the precipitate is dried. With certain types of catalysts a subsequent heat treatment may be of advantage (for instance thermal decomposition without substantial sintering may be effected).

Another method is to impregnate a suitable support, for instance diatomaceous earth, silica gel or charcoal, with an aqueous solution of a copper salt and to dry the impregnated material. Yet another method is to mix the dry copper compound with a carrier and to heat the mixture. Sometimes it is advantageous to pre-reduce the catalyst, but usually this occurs in the first stage of the hydrogenation. Especially when unrefined or incompletely refined oils are used, the pre-reduction step may be of vital importance.

A further method of preparing a suitable catalyst is to treat an alloy of copper with a more electropositive metal, for instance aluminum, magnesium, zinc, cadmium or iron, so as to dissolve out the said metal and leave the copper in porous form. With alloys of aluminium or zinc, for instance, the metal can be dissolved out by treatment with aqueous alkali while aqueous acid can be used to dissolve out other electro-positive metals such as magnesium, iron, as well as zinc and cadmium.

The amount of catalyst used varies between wide limits and depends on the activity of the catalyst. Preferably, the amount of catalyst varies between 0.01 and 2.0% of copper calculated on the amount of oil to be hydrogenated, depending on the purity of the starting oil and the type of catalyst used.

Since in general the catalysts are easily poisoned, it is desirable to use as a raw material an oil of good quality which has been subjected to pre-refining. Although the method according to the present invention makes it possible to prepare products having good keeping properties from unrefined oils, it is necessary to use substantially higher proportions of copper catalyst, based on the amount of oil to be hydrogenated. Because the amount of catalyst used greatly affects the economics of the process, it is specially advisable to use as starting material a good quality pre-refined oil and particularly one that has already been bleached.

The pre-refining treatment may comprise the following steps: desliming, sometimes termed degumming, neutralisation, bleaching and deodorisation. In the last step also a drying of the material is obtained, owing to the temperature and vacuum conditions in the deodoriser.

Of the various refining steps referred to, however, deodorisation is the least important as a pre-refining step and may well be deferred until the end of the hydrogenation. In that case, it is very desirable that the oil be dried for instance to a moisture content not greater than 0.04%, before hydrogenation, since otherwise rapid poisoning of the catalyst by moisture may occur. Hence the treatment of oil which is not substantially moisture-free will involve a considerably high consumption of catalyst. Prior to the alkali refining the phosphatides are removed by a desliming treatment, and thereafter the free fatty acid content may be reduced by the alkaline treatment to below 0.8%, preferably below 0.2%.

The bleaching is preferably effected by treatment with a bleaching earth, especially acid-activated fuller's earth. In this step the oil may with advantage be decolourised until for soya bean oil, for example, a colour is obtained according to the Lovibond test 5¼" cell), below 25 yellow, 3 red, preferably below 20 yellow, 1.1 red.

The pressure at which the hydrogenation is carried out may vary, e.g. between 1 and 200 atmospheres. Generally pressures of 5 to 10 atmospheres are preferred, since it has been found that by using pressures within this range isomerisation of linoleic acid especially to conjugated isomers can be restricted to a minimum.

The intensity of agitation and the excess quantity of hydrogen passed through the oil are less important as they hardly affect the characteristics of the resulting product. In accordance with the particular reaction conditions the reaction time may vary between a few minutes and several hours.

As indicated above, when soya bean oil is used as the starting material, which oil, optionally subjected to a pre-refining treatment, contains about 8% of linolenic acid and about 53% of linoleic acid, in order to obtain from this soya bean oil containing relatively small amounts of linolenic acid, say 0 to 50% of the original content, and which has also retained a relatively high amount of linoleic acid, for example 40 to 80% of the original content, it is essential to stop hydrogenation at a suitable stage, for example by shutting off the supply of hydrogen when an iodine value of from 100 to 125 has been reached.

In a preferred embodiment of the invention the hydrogenation is stopped when the oils obtained contain linolenic acid in an amount of 0 to 30% of the original content and linoleic acid in an amount of 50 to 75% of the original content; such products have been obtained by stopping the hydrogenation at an iodine value of from 105 to 120.

For optimal results, that is to say when from the same starting material oils are to be obtained containing linolenic acid in an amount of 5 to 20% of the original content and at least 60% of the original content of linoleic acid, the hydrogenation may be discontinued at iodine values of 112 to 117.

It will be evident that when a selective hydrogenation is carried out with a certain type of soya bean oil, the amounts both of linolenic and linoleic acids in the finished product depend on the composition of the said starting material. Hence, the iodine value at which the hydrogenation has to be discontinued must be chosen according to the product required and the starting material which is available.

From rapeseed oils containing about 10% of linolenic acid and about 15 to 20% of linoleic acid products have been obtained in which the linolenic acid content has been reduced to 2% by weight or even less while retaining some 12 to 15% by weight of linoleic acid (cis,cis-9,12-octadecadienoic acid) by stopping the hydrogenation at an iodine value within the range of 92 to 95. With wheat germ oil containing 5 to 15% of linolenic acid and 40 to 60% of linoleic acid products have been obtained in which the linolenic acid content has been reduced to some 2% or less by weight, while retaining some 30 to 35% of unchanged linoleic acid, by stopping the hydrogenation at an iodine value within the range of 108 to 120.

Residual copper should be removed as soon as the hydrogenation has been stopped. Preferably, the catalyst and copper traces thereof are removed in two steps: first the bulk of the catalyst mass is removed, for example by filtration, and the catalyst may be used again, and secondly metal traces are chemically removed from the filtrate. Moreover, in order to prevent the occurrence of oxidation reactions, it is necessary to carry out the filtration at a temperature below 100° C. and/or with exclusion of air. The chemical removal of metal traces may be effected by washing the oil with a dilute aqueous solution of an acid of dissociation constant for the first hydrogen atom not less than $10^{-3}$, for instance a strong mineral acid such as hydrochloric, sulphuric or phosphoric acid, in for instance 0.3 molar concentration, or with a solution of a metal sequestering agent, for example a 0.25 molar solution of the disodium salt of ethylenediaminetetraacetic acid. Treatment with cation-exchange resins also gives satisfactory results.

Oil products prepared as described above may be used for various types of edible products. For the production of salad oil for example it may be necessary to subject the soya bean product as described above to winterization. Upon chilling, the oil deposits a small amount of high melting glyceride which is removed in order to obtain a product which will remain clear at low temperatures. For the manufacture of salad dressings a semi-solid emulsion may be made containing at least 50% of the oil product according to the invention, egg yolk or whole egg, vinegar and/or lemon juice, salt and seasoning.

Oils treated according to the invention are excellent starting materials for shortenings and several types of margarine. It is preferred to make these products by using votator apparatus. In the votator solidification takes place in a completely closed system with highly efficient utilization of refrigeration and complete control of the ingredients and the product obtained. In the manufacture of margarine a votator with recirculation of the cooled emulsion may be used.

The following examples illustrate the manufacture and the use of the hydrogenated oils prepared according to the method of the present invention.

In the examples a pre-refined oil means one that has been deslimed, neutralised, bleached and deodorised and in consequence, contains less than 0.04% of moisture.

EXAMPLE 1

A pre-refined soya bean oil characterised by the following figures:

| | |
|---|---|
| Free fatty acid content | 0.05% |
| Colour (Lovibond 5¼″ cell) | 20 yellow, 1.1 red. |
| Iodine value | 134. | had a fatty acid composition of:

| | Percent |
|---|---|
| Linolenic acid | 8.5 |
| Linoleic acid | 52.5 |
| Oleic acid | 24.0 |
| Stearic acid | 4.0 |
| Palmitic acid | 11.0 |

The oil was hydrogenated at a pressure of 5 atmospheres gauge pressure in the presence of a catalyst obtained by precipitation of copper compounds with sodium carbonate in the presence of kieselguhr. An amount of catalyst equivalent to 1% by weight of catalyst calculated on the oil was used. The catalyst was prepared by stirring 100 g. of kieselguhr with 100 g. of crystalline copper sulphate in hot water. Subsequently 325 cc. of a 10% aqueous sodium carbonate solution was added and the precipitate was filtered and washed with water until the wash-water was neutral. Thereafter the catalyst was dried and ground.

The reaction temperature of the hydrogenation process was 180° C. After 50 minutes the reaction was stopped at an iodine value of 112. The course of the reaction was followed in the usual way by means of change in refractive index.

The product obtained was characterised by the following fatty acid composition determined by gas chromatography:

| | Percent |
|---|---|
| Linolenic acid | 1.0 |
| Linoleic acid | 44.5 |
| Oleic acid | 40.0 |
| Stearic acid | 4.0 |
| Palmitic acid | 11.0 |

This means that K value of 7 was reached.

It was established that the major part of the 9,12-octadecadienoic acid present was still in the naturally occurring configuration so that a product with 40% of essential fatty acid (cis,cis-9,12-octadecadienoic acid) was obtained. Immediately after filtration the product was washed with a 3.0% by weight aqueous solution of ethylene diamine tetraacetic acid disodium salt to remove copper traces. To reduce residual copper to less than 0.1 p.p.m. the oil was then washed with water and finally subjected to conventional deacidification, bleaching and deodorisation operations.

A long storage test showed that the product obtained had a considerably greater stability against flavour reversion than the original soya bean oil. By comparison it was found that when hydrogenating the same soya bean oil under selective conditions with a nickel catalyst to a product with a linolenic acid content of 1%, only 18% of 9,12-octadecadienoic acid was left an the iodine value had decreased to 94.

EXAMPLE 2

In the table below it is shown that soya bean oil of a fatty acid composition as specified in Example 1 may be hydrogenated to a product rich in linoleic acid by using different types of copper catalysts and applying, except for the amount of catalyst used, the same process conditions and base product as mentioned in Example 1. All the catalysts, except numbers 3 and 5, were prepared by the precipitation method described in Example 1. Numbers 3 and 5 were made by precipitation of ammonium copperchromate (in the case of No. 5 in admixture with barium chromate), followed by heating in air at 350° C., to effect decomposition of the copper salt without sintering.

This hydrogenation was followed by the same process of removing copper as described in Example 1. The analyses were carried out by means of gas chromatography.

| | Catalyst | | | Product | | | | | |
|---|---|---|---|---|---|---|---|---|---|
| No. | Kind | Cu content of catalyst (percent) | Amount Cu on oil | Linolenic acid* | Linoleic acid* | Oleic acid* | Stearic acid* | I.V. | K |
| 1 | Cu/kieselguhr | 46 | 0.5 | 0.7 | 44.5 | 40.0 | 4.0 | 112.1 | 8 |
| 2 | Cu/Al₂O₃ | 43 | 0.5 | Trace | 44.5 | 39.5 | 4.0 | 111.3 | 14 |
| 3 | Cu/Cr₂O₃ | 40 | 0.2 | Trace | 44.5 | 39.0 | 4.0 | 111.2 | 14 |
| 4 | Cu/MgO | 38 | 0.4 | Trace | 44.5 | 39.0 | 4.0 | 111.6 | 14 |
| 5 | Cu/Cr₂O₃/BaO | 30 | 0.1 | Trace | 45.5 | 39.5 | 4.0 | 112.0 | 14 |
| 6 | Cu/MgO/SiO₂ | 17 | 0.1 | Trace | 45.0 | 39.0 | 4.0 | 111.2 | 14 |

*Final Fatty Acid Composition (Percent)

EXAMPLE 3

Within the temperature range of 150° to 200° C. the hydrogenation of a soya bean oil of the composition specified in Example 1 is insensitive to variations in temperature, as illustrated by the following examples where the hydrogenation was stopped at an iodine value of about 116. A gauge pressure of 5 atmospheres was applied.

| Reaction temperature, °C. | Linolenic acid* | Linoleic acid* | Oleic acid* | Stearic acid* | I.V. | K |
|---|---|---|---|---|---|---|
| 150 | 1.5 | 45.0 | 37.0 | 4.0 | 115.8 | 7 |
| 200 | 1.5 | 45.0 | 37.0 | 4.5 | 115.8 | 7 |

*Final fatty acid composition (percent)

EXAMPLE 4

The desired result of the invention can be realised by applying a wide range of hydrogenation pressures as already explained above. To illustrate this, the results obtained by hydrogenating to an iodine value of 114, a soya bean oil of a composition specified in Example 1, under two different pressures at a temperature of 180° C. are given below:

| Pressure atmosphere gauge | Linolenic acid* | Linoleic acid* | Oleic acid* | Stearic acid* | I.V. | K |
|---|---|---|---|---|---|---|
| 3 | 0.8 | 44.0 | 37.5 | 4.0 | 114.8 | 9 |
| 65 | 0.8 | 44.0 | 37.5 | 4.0 | 114.3 | 9 |

*Final fatty acid composition (percent)

EXAMPLE 5

Although in general reduction of the catalyst is easily effected under the reaction conditions, the water evolved in this catalyst activation stage may exert an unfavourable influence on the catalyst unles sufficient measures are taken for immediate removal of this water. If adequate attention is paid to this aspect, the hydrogenated products obtained with a pre-reduced and a non-reduced catalyst do not differ significantly as is illustrated by the following results, obtained by hydrogenating a pre-refined soya bean oil at 5 atmospheres gauge pressure and 180° C. The light absorption of the refined oil treated when determined by the Lovibond method referred to above was yellow 20, red 1.1.

The catalyst referred to as "non-reduced" in this example was made by co-precipitation of copper sulphate and magnesium sulphate from aqueous solution by the addition of an aqueous solution of sodium silicate and sodium carbonate, each of the salts being present initially in equimolar proportions. The catalyst so obtained was dried and ground before use. The catalyst referred to as "pre-reduced" was made in the same way except that its was subjected to the reducing action of hydrogen at a temperature of 200° C. immediately before use.

| Catalyst at the beginning of the experiment | Linolenic acid* | Linoleic acid* | Oleic acid* | Stearic acid* | I.V. | K |
|---|---|---|---|---|---|---|
| Non-reduced | Trace | 44.0 | 39.0 | 4.0 | 112.9 | 14 |
| Pre-reduced | do | 43.5 | 39.5 | 4.0 | 111.6 | 14 |

*Fatty acid composition of product (percent)

EXAMPLE 6

To show that the selective hydrogenation of the present invention may also be applied to an unrefined oil, an unrefined soya bean oil was used characterised by the following figures:

Free fatty acid content _____ 0.8%.
Colour (Lovibond 5¼″ cell) _____ 30 yellow, 9 red.
Iodine value _____ 134.

The fatty acid composition was:

| | Percent |
|---|---|
| Linolenic acid | 9.5 |
| Linoleic acid | 54.0 |
| Oleic acid | 22.0 |
| Stearic acid | 4.0 |

The oil was hydrogenated at a pressure of 5 atmospheres gauge pressure and a temperature of 185° C. until an iodine value of 113.2 was reached. The pre-reduced type of catalyst as described in Example 5 was used in an amount of 1% by weight calculated as copper on the amount of oil. The product obtained was characterised by the following fattty acid composition:

| | Percent |
|---|---|
| Linolenic acid | 0.5 |
| Linoleic acid | 44.5 |
| Oleic acid | 38.5 |
| Stearic acid | 4.0 |

The resulting K value was 9.

EXAMPLE 7

A pre-refined rapeseed oil containing 17.5% of linoleic acid and 10% of linolenic acid and having an iodine value of 113 was hydrogenated at 180° C. under a pressure of 5 atmospheres gauge pressure using 0.2% of copper based on the weight of the oil of the Cu/MgO/SiO$_2$ referred to in Example 5.

The hydrogenation was stopped at an iodine value of 95. The product had excellent keeping properties and contained 14% of unmodified linoleic acid.

EXAMPLE 8

A pre-refined wheat germ oil, containing 9% of linolenic acid and 53% of linoleic acid and having an iodine value of 130, was hydrogenated as described in Example 7 except that the hydrogenation was stopped at an iodine value of 116.

A product was obtained having good keeping properties and containing 36% of its weight of unmodified linoleic acid.

EXAMPLE 9

To show the improved keeping properties of the soya bean oils hydrogenated according to the present invention, organoleptic tests were made in which the said oils were compared with a fully refined soya bean oil.

Two tests were employed, a so-called quick test, in which the oil is tested during four days when placed in diffuse daylight and a slow test, in which the oil is stored in the dark at a temperature of 15° C. and tested once every two weeks during a period of six weeks.

The tests were carried out by a well skilled tasting panel. For the slow test the preferences summarised are shown below. For the quick test assessment was expressed in figures of merit from 0 to 6.

*Slow test*

| | Number of persons preferring— | | | |
|---|---|---|---|---|
| | After 0 w. | After 2 w. | After 4 w. | After 6 w. |
| Fully refined soya bean oil | 6 | 0 | 1 | 0 |
| Hydrogenated product after refining | 14 | 19 | 19 | 20 |

*Quick test*

| | Average of figures of merit expressed by a panel of 10 pers. | | | | |
|---|---|---|---|---|---|
| | 0 days | 1st day | 2d day | 3d day | 4th day |
| Fully refined soya bean oil | 5+ | 4− | 2½ | Very bad. | |
| Hydrogenated product | 6 | 6 | 5½ | 5− | 4½ |

The results of these tests indicated that there is a reasonable correlation between both tests and that the hydrogenation according to the invention has greatly improved the keeping properties of the oil.

EXAMPLE 10

To show the remarkable improvement in the keeping properties, even when the hydrogenated products were compared with sunflower oil, a number of tests were made using the quick test as already described in Example 9.

It is well known that the keeping properties of sunflower oil are very good:

| Type of oil | Linolenic acid* | Linoleic acid* | Quick test | | | I.V. | K |
|---|---|---|---|---|---|---|---|
| | | | 1st day | 2d day | 3d day | | |
| Hydrogenated product | 0.7 | 44.0 | 6 | 6 | 6 | 114.3 | 9 |
| Do | 2.0 | 48.0 | 6 | 6 | 6− | 117.4 | 7 |
| Sun-flower oil | 0.1 | 59.0 | 6 | 6 | 5 | 128 | |

* Fatty acid composition (percent)

It will be noted from the figures given above that, even though it contains 2% of linolenic acid, a soya bean oil hydrogenated according to the invention, showed excellent results with regard to its keeping properties.

EXAMPLE 11

An excellent salad oil was made of soya bean oil hydrogenated and purified according to the invention.

The oil had an iodine value of 115.1 and the following fatty acid composition:

| | Percent |
|---|---|
| Linolenic acid | 1.5 |
| Linoleic acid | 46.5 |
| Oleic acid | 35.0 |
| Stearic acid | 4.0 |

After winterizing at 5° C. the yield of liquid phase was 86%. The resulting salad oil had an iodine value of 118.0 and the following fatty acid composition:

| | Percent |
|---|---|
| Linolenic acid | 1.5 |
| Linoleic acid | 49.0 |
| Oleic acid | 34.5 |
| Stearic acid | 3.5 |

EXAMPLE 12

A dietary fat composed of:

75% soya bean oil hydrogenated and purified according to the invention (iodine value 114–115);
25% palm oil hardened to a slip melting point of 45° C. was prepared in a usual votator arrangement for shortenings.

The hardness of the fat measured by the method of A. J. Haighton (as published in J.A.O.C.S., 36 (1959), page 345), was as follows:

10° C.: 0.50 kg./cm.$^2$
15° C.: 0.35 kg./cm.$^2$
20° C.: 0.25 kg./cm.$^2$

EXAMPLE 13

A high ratio shortening was manufactured in a usual votator arrangement.

The fat was composed of:

50% soya bean oil hydrogenated and purified according to the invention (iodine value 114–115),
40% cottonseed oil hardened to a slip melting point of 32–34° C., and having the following dilatometric characteristics:
$D_{20}$: 1000; $D_{30}$; I.V. 75;
5% cottonseed oil hardened to a slip melting point of 50° C.;
5% emulsifier (mono-diglycerides with a mono content of about 40%).

The hardness of the shortening measured by the method indicated in Example 12 was as follows:

15° C.: 0.94 kg./cm.$^2$
20° C.: 0.69 kg./cm.$^2$
25° C.: 0.30 kg./cm.$^2$

EXAMPLE 14

A low-melting margarine containing 16% of water and 84% of fat was prepared. The composition of the fatty material was as follows:

50% soya bean oil hydrogenated and purified according to the invention (iodine value 114–115);
5% coconut oil;
35% cottonseed oil hardened to a slip melting point of 35° C.;
10% palm oil hardened to a slip melting point of 45° C.

The margarine was processed in a votator with recirculation of the cooled emulsion. The hardness of the product measured by the method indicated in Example 12 was as follows:

10° C.: 0.65 kg./cm.$^2$
15° C.: 0.28 kg./cm.$^2$
20° C.: 0.18 kg./cm.$^2$

EXAMPLE 15

A vegetable table margarine containing 16% water and 84% fat was prepared using the same votator arrangement as mentioned in Example 14. The composition of the fatty material was as follows:

35% soya bean oil hydrogenated and purified according to the invention (iodine value 114–115);
30% coconut oil;
5% palm oil;
25% cottonseed oil hardened to a slip melting point of 34° C.;
5% palm oil hardened to a slip melting point of 45° C.

The hardness of the margarine measured after storage was:

15° C.: 0.45 kg./cm.$^2$
20° C.: 0.15 kg./cm.$^2$ measured as described in Example 12.

EXAMPLE 16

A table margarine containing 16% of water and 84% of fat was prepared in the same votator arrangement as mentioned in Example 14.

The composition of the fatty material was as follows:

25% soya bean oil hydrogenated according to the invention (iodine value 114–115);
35% coconut oil;
15% palm oil;
20% whale oil hardened to a slip melting point of 36° C.;
5% whale oil hardened to a slip melting point of 45° C.

The hardness of the margarine after storage, measured by the method indicated in Example 12, was:

15° C.: 0.68 kg./cm.$^2$
20° C.: 0.25 kg./cm.$^2$

We claim:
1. A process for catalytically selectively hydrogenating oils containing linoleic acid in addition to more highly unsaturated fatty acids, so as to obtain improved keeping properties, which comprises hydrogenating the oil at a temperature of 150 to 225° C. in the presence of a hydrogenation catalyst composed essentially of copper present in the form of a substance selected from the class consisting of copper and copper compounds until the content of the more highly unsaturated fatty acids has been diminished, while retaining at least 40% of the original content of linoleic acid, after which the hydrogenated oil is substantially freed from traces of copper.

2. Process according to claim 1, wherein the oil treated is soya bean oil.

3. Process according to claim 1, wherein the oil treated is earth-bleached soya bean oil substantially free from phosphatides and containing not more than 0.8% of free fatty acid.

4. Process according to claim 1, wherein the oil treated is earth-bleached soya bean oil substantially free from phosphatides and containing not more than 0.8% of free fatty acid and not more than 0.4% by weight of moisture, the catalyst being free from oxygen-containing compounds which are reducible by hydrogenation under the conditions of the process.

5. Process according to claim 1, wherein the oil treated is earth-bleached soya bean oil substantially free from phosphatides and containing not more than 0.8% of free fatty acid and not more than 0.4% by weight of moisture, the catalyst being free from oxygen containing compounds which are reducible by hydrogenation under the conditions of the process, the diminution in the content of more highly unsaturated fatty acids amounting to at least 30% of the initial content thereof.

6. Process according to claim 1 wherein, after the hydrogenation the oil is immediately freed from the bulk of residual catalyst by filtration with exclusion of air after which it is washed with an aqueous solution of a substance selected from the class consisting of acids of dissociation constant for the first hydrogenation atom not less than $10^{-3}$ and metal-complexing agents until the copper content of the oil is reduced to less than 0.1 part per million.

7. Process according to claim 1 wherein, after the hydrogenation the oil is immediately freed from the bulk of residual catalyst by filtration at a temperature not greater than 100° C. after which it is washed with an aqueous solution of a substance selected from the class consisting of acids of dissociation constant for the first hydrogenation atom not less than $10^{-3}$ and metal-complexing agents until the copper content of the oil is reduced to less than 0.1 part per million.

8. The process according to claim 1 in which the catalyst is a supported catalyst with copper being the only active material.

9. The process according to claim 1 in which K, the selectivity coefficient, is at least 7.

10. The process according to claim 1 in which the oil before hydrogenation contains linolenic acid and in which the hydrogenated oil contains linolenic acid in an amount of 5% to 20% the original content.

11. A process for catalytically selectively hydrogenating oils containing linoleic acid in addition to more highly unsaturated fatty acids, so as to obtain improved keeping properties, which comprises hydrogenating the oil at a temperature of 150 to 225° C. in the presence of a hydrogenation catalyst composed essentially of copper present in the form of a substance selected from the class consisting of copper and copper compounds, copper being the only metal present that is effective in the hydrogenation of olefinic double bonds, until the content of the more highly unsaturated fatty acids has been diminished, while retaining at least 40% of the original content of linoleic acid, after which the hydrogenated oil is substantially freed from traces of copper.

12. A process for catalytically selectively hydrogenating oils containing linoleic acid in addition to more highly unsaturated fatty acids, so as to obtain improved keeping properties, which comprises hydrogenating the oil at a temperature of 150 to 225° C. in the presence of a hydrogenation catalyst composed essentially of copper present in the form of a substance selected from the class consisting of copper and copper compounds until the content of the more highly unsaturated fatty acids has been diminished by at least 30% of the initial content thereof, while retaining at least 40% of the original content of linoleic acid, after which the hydrogenated oil is substantially freed from traces of copper.

13. Process for preparing an edible oil of good keeping properties containing at least 40% of cis,cis-9,12-octadecadienoic acid and not more than about 4.5% of stearic acid, which comprises hydrogenating soya bean oil of iodine value at least 130 at a temperature of 150 to 225° C. in the presence of a hydrogenation catalyst composed essentially of copper present in the form of a substance selected from the class consisting of copper and copper compounds until the iodine value has been diminished to within the range of 100 to 125.

14. Process for preparing an edible oil of good keeping properties containing at least 40% of cis,cis-9-12-octadecadienoic acid and not more than about 4.5% of stearic acid which comprises hydrogenating earth-bleached soya bean oil substantially free from phosphatides and containing not more than 0.8% of free fatty acid and of iodine value at least 130, at a temperature of 150 to 225° C. in the presence of a hydrogenation catalyst composed essentially of copper present in the form of a substance selected from the class consisting of copper and copper compounds until the iodine value has been diminished to within the range of 100 to 125.

15. The process according to claim 14 in which the catalyst is a supported catalyst made by the precipitation method and consisting essentially of copper and magnesium oxide with copper being the only active material.

16. The process according to claim 14 in which the catalyst is a supported catalyst made by the precipitation method and consisting essentially of copper, magnesium oxide and silicon dioxide with copper being the only active material.

17. Process for preparing an edible oil of good keeping properties containing at least 40% of cis,cis-9,12-octadecadienoic acid and not more than about 4.5% of stearic acid which comprises hydrogenating earth-bleached soya bean oil substantially free from phosphatides and containing not more than 0.8% of free fatty acid and not more than 0.4% of moisture and of iodine value at least 130, at a temperature of 150 to 225° C. in the presence of a hydrogenation catalyst composed essentially of copper present in the form of a substance selected from the class consisting of copper and copper compounds, the catalyst being free from oxygen containing compounds which are reducible by hydrogenation under the conditions of the process, the hydrogenation being continued until the iodine value has been diminished to within the range of 100 to 125.

References Cited by the Examiner

UNITED STATES PATENTS

| | | | |
|---|---|---|---|
| 2,026,735 | 1/1936 | Gill | 260—409 |
| 2,163,603 | 6/1939 | Jeness | 260—409 |
| 2,302,994 | 11/1942 | Gwynn | 260—409 |
| 2,671,097 | 3/1954 | Royce et al. | 260—409 |

CHARLES B. PARKER, *Primary Examiner.*

DANIEL D. HORWITZ, *Assistant Examiner.*

UNITED STATES PATENT OFFICE
CERTIFICATE OF CORRECTION

Patent No. 3,278,568                            October 11, 1966

Albert de Jonge et al.

It is hereby certified that error appears in the above numbered patent requiring correction and that the said Letters Patent should read as corrected below.

Column 1, line 41, for "the" read -- that --; column 3, line 57, for "high" read -- higher --; column 6, line 18, for "an" read -- and --; column 7, line 18, for "unles" read -- unless --; line 35, for "its" read -- it --; column 9, line 72, after "$D_{30}$" insert -- :500 --.

Signed and sealed this 29th day of August 1967.

(SEAL)
Attest:

ERNEST W. SWIDER                      EDWARD J. BRENNER
Attesting Officer                       Commissioner of Patents